US008644224B2

(12) United States Patent
Iwamura (10) Patent No.: US 8,644,224 B2
(45) Date of Patent: Feb. 4, 2014

(54) MOBILE COMMUNICATION METHOD, MOBILE STATION, AND RADIO BASE STATION

(75) Inventor: Mikio Iwamura, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/643,451

(22) PCT Filed: Apr. 28, 2011

(86) PCT No.: PCT/JP2011/060359
§ 371 (c)(1),
(2), (4) Date: Jan. 2, 2013

(87) PCT Pub. No.: WO2011/136321
PCT Pub. Date: Nov. 3, 2011

(65) Prior Publication Data
US 2013/0100837 A1    Apr. 25, 2013

(30) Foreign Application Priority Data
Apr. 30, 2010   (JP) .............................. P2010-106002

(51) Int. Cl.
*H04W 4/00*    (2009.01)
(52) U.S. Cl.
USPC ...................................................... 370/328
(58) Field of Classification Search
USPC .......... 370/331, 332, 334; 455/436, 437, 444, 455/452.2
See application file for complete search history.

(56) References Cited

U.S. PATENT DOCUMENTS

| 2004/0190486 | A1* | 9/2004 | Oshiba .......................... 370/349 |
| 2006/0189323 | A1* | 8/2006 | Usuda et al. .................. 455/453 |
| 2007/0287461 | A1* | 12/2007 | Ryu et al. ....................... 455/436 |
| 2008/0045145 | A1* | 2/2008 | Nakatsugawa ............... 455/11.1 |
| 2008/0062930 | A1* | 3/2008 | Niemela et al. ............... 370/331 |
| 2009/0047960 | A1* | 2/2009 | Gunnarsson et al. ......... 455/436 |
| 2009/0047968 | A1* | 2/2009 | Gunnarsson et al. ......... 455/446 |
| 2009/0067374 | A1* | 3/2009 | Yoon et al. .................... 370/329 |
| 2012/0190374 | A1* | 7/2012 | Jo et al. .......................... 455/450 |
| 2013/0012189 | A1* | 1/2013 | Hamabe et al. ............ 455/422.1 |

FOREIGN PATENT DOCUMENTS

CN    101674586 A    3/2010

OTHER PUBLICATIONS

International Search Report w/translation issued in PCT/JP2011/060359 mailed May 31, 2011 (3 pages).
Written Opinion issued in PCT/JP2011/060359 mailed May 31, 2011 (4 pages).
MediaTek Inc.; "Measurement Events Generalization for Carrier Aggregation"; 3GPP TSG-RAN WG2 #69, R2-101146; San Francisco, USA; Feb. 22-26, 2010 (3 pages).
Motorola; "Corrections to measurements and associated ASN.1"; 3GPP TSG-RAN2#62, R2-082621; Kansas City, USA; May 5-9, 2008 (4 pages).

(Continued)

*Primary Examiner* — Anh-Vu Ly
*Assistant Examiner* — Gustavo Lopez-Vargas
(74) *Attorney, Agent, or Firm* — Osha Liang LLP (57) ABSTRACT

In the mobile communication system according to the present invention, when the RSRP or RSRQ in a non-serving cell of SCC within "MeasObject" is larger than the sum of the RSRP or RSRQ in an Scell within the "MeasObject" and a predetermined offset value (Offset) for a predetermined period (Time-To-Trigger), the mobile station UE determines that "ReportConfig-A6" is satisfied.

2 Claims, 6 Drawing Sheets

(56) References Cited

OTHER PUBLICATIONS

Huawei; "Potential problem for the additional event for ICIC"; 3GPP TSG RAN WG2 #63bis, R2-085543; Prague, Czech Republic; Sep. 29-Oct. 3, 2008 (11 pages).

Nokia Siemens Networks, et al.; "Algorithms and results for autonomous component carrier selection for LTE-Advanced"; 3GPP TSG RAN WG1 #54bis Meeting, R1-083733; Prague, Czech Republic; Sep. 29-Oct. 3, 2008 (5 pages).

3GPP TS 36.331 V9.2.0; "3rd Generation Partnership Project; Technical Specification Group Radio Access Network; Evolved Universal Terrestrial Radio Access (E-UTRA); Radio Resource Control (RRC); Protocol specification (Release 9)"; Mar. 2010 (248 pages).

Japanese Office Action w/English translation mailed on May 31, 2011, in corresponding Japanese Application No. 2010-106002 (6 pages).

Japanese Office Action w/English translation mailed on Dec. 6, 2011, in corresponding Japanese Application No. 2010-106002 (5 pages).

Office Action in corresponding Chinese application No. 201180020831.X dated Jun. 28, 2013 (10 pages).

Espacenet Abstract, Publication No. CN101674586 dated Mar. 17, 2010 (1 page).

* cited by examiner

- A1: Serving > Thresh
  - → Pcell OR Scell ON MeasObject LINKED BY Serving=MeasId
  - → When MeasObject IS SET TO Non-configured CC, ERROR IS DETECTED
- A2: Serving < Thresh
  - → Pcell OR Scell on MeasObject LINKED BY Serving=MeasId
  - → When MeasObject IS SET TO Non-configured CC, ERROR IS DETECTED
- A3: Neighbour > Serving (Pcell) + Offset
  - → Serving = Pcell
  - → CELL ON MeasObject LINKED BY Neighbor=MeasId
    (Pcell NOT BE INCLUDED, AND Scell MAY OR MAY NOT BE INCLUDED)
- A4: Neighbour > Thresh
  - → CELL ON MeasObject LINKED BY Neighbor=MeasId (Pcell/Scell NOT BE INCLUDED)
- A5: Serving < Thresh1 && Neighbour > Thresh2
  - → Serving = Pcell
  - → CELL ON MeasObject LINKED BY Neighbor=MeasId
    (Pcell NOT BE INCLUDED, AND Scell MAY OR MAY NOT BE INCLUDED)
- A6: Neighbour > Serving + Offset
  - → Scell ON MeasObject LINKED BY Serving=MeasId
  - → WHEN MeasObject IS SET TO Non-configured CC, ERROR IS DETECTED
    (ALSO WHEN SET TO PCC, ERROR MAY BE DETECTED.
    OTHERWISE, Serving=Pcell IS ESTABLISHED.)
  - → CELL ON MeasObject LINKED BY Neighbor=MeasId (Scell (Pcell)
    NOT BE INCLUDED)
- A7: Neighbour (Scell) < Serving (Pcell)+Offset
  - → Serving = Pcell
  - → Scell ON MeasObject LINKED BY Neighbor=MeasId

FIG. 5

> A7alt: Neighbour (any cell) < Serving (Pcell)+Offset
  → Serving = Pcell
  → CELL ON MeasObject LINKED BY Neighbor=MeasId

MOBILE COMMUNICATION METHOD, MOBILE STATION, AND RADIO BASE STATION

TECHNICAL FIELD

The present invention relates to a mobile communication method, a mobile station, and a radio base station.

BACKGROUND ART

According to an LTE-Advanced scheme, a mobile station UE is configured to be able to perform CA (Carrier Aggregation) communication with a radio base station eNB, by using PCC (Primary Component Carrier) and one or a plurality of SCCs (Secondary Component Carriers) having different carrier frequencies (EARFCN: E-UTRA Absolute Radio Frequency Channel Number).

When the radio base station eNB performs "Joint Scheduling" across a plurality of CCs, as far as possible, a scheduler selects CCs with a good radio quality to perform scheduling, and therefore, when a general scheduler such as "Proportional Fairness" is used, the CCs with a bad radio quality are hardly selected, and if such CCs are used for CA communication, the process load (coefficient computation load) of scheduling in the radio base station eNB increases, and the battery load and process load in the mobile station UE increase, thus posing a problem.

Furthermore, when "Independent Scheduling" of each CC is performed, and when CCs with a bad radio quality are added, the radio base station eNB only takes the resources of other mobile stations UE, which declines the efficiency of the entire system, again posing a problem.

Therefore, the present invention has been achieved in view of the above problems, and an object thereof is to provide a mobile communication method, a mobile station, and a radio base station by which the CCs used in CA communication can be managed appropriately in accordance with the radio quality and network load.

SUMMARY OF THE INVENTION

A first characteristic of the present embodiment is summarized in that a mobile communication method by which a mobile station communicates with a radio base station by using a primary carrier and one or a plurality of secondary carriers having different carrier frequencies, comprising, a step A of transmitting, by the radio base station, measurement control information including a carrier to be measured and a reporting condition, to the mobile station, and a step B of transmitting, by the mobile station, a measurement report including a measurement result of the carrier to be measured, to the radio base station, when the reporting condition is satisfied, in which in the step B, when a measurement value of a radio quality in a non-serving cell within the carrier to be measured is larger than a sum of a measurement value of a radio quality in a serving cell within the carrier to be measured and a predetermined offset value for a predetermined period, the mobile station determines that the reporting condition is satisfied.

A second characteristic of the present embodiment is summarized in that a mobile communication method by which a mobile station communicates with a radio base station by using a primary carrier and one or a plurality of secondary carriers having different carrier frequencies, comprising, a step A of transmitting, by the radio base station, measurement control information including a carrier to be measured and a reporting condition, to the mobile station, and a step B of transmitting, by the mobile station, a measurement report including a measurement result of the carrier to be measured, to the radio base station, when the reporting condition is satisfied, in which in the step B, when a measurement value of a radio quality in a serving cell of a secondary carrier within the carrier to be measured is smaller than a sum of a measurement value of a radio quality in a serving cell of the primary carrier and a predetermined offset value for a predetermined period, the mobile station determines that the reporting condition is satisfied.

A third characteristic of the present embodiment is summarized in that a mobile communication method by which a mobile station communicates with a radio base station by using a primary carrier and one or a plurality of secondary carriers having different carrier frequencies, comprising, a step of transmitting, by the radio base station, measurement control information including a carrier to be measured and a reporting condition, to the mobile station, and a step of transmitting, by the mobile station, a measurement report including a measurement result of the carrier to be measured, to the radio base station, when the reporting condition is satisfied, and a step of adding and deleting a secondary carrier, by the radio base station, in accordance with the measurement report, and a step of changing the reporting condition, by the radio base station, in accordance with the network load.

A fourth characteristic of the present embodiment is summarized in that a mobile station configured to be able to communicate with a radio base station by using a primary carrier and one or a plurality of secondary carriers having different carrier frequencies, comprising, a reception unit configured to receive measurement control information including a carrier to be measured and a reporting condition, from the radio base station, and a transmission unit configured to transmit a measurement report including a measurement result of the carrier to be measured, to the radio base station, when the reporting condition is satisfied, in which the transmission unit is configured to determine that the reporting condition is satisfied, when a measurement value of a radio quality in a non-serving cell within the carrier to be measured is larger than a sum of a measurement value of a radio quality in a serving cell within the carrier to be measured and a predetermined offset value for a predetermined period.

A fifth characteristic of the present embodiment is summarized in that a mobile station configured to be able to communicate with a radio base station by using a primary carrier and one or a plurality of secondary carriers having different carrier frequencies, comprising, a reception unit configured to receive measurement control information including a carrier to be measured and a reporting condition, from the radio base station, and a transmission unit configured to transmit a measurement report including a measurement result of the carrier to be measured, to the radio base station, when the reporting condition is satisfied, in which the transmission unit is configured to determine that the reporting condition is satisfied, when a measurement value of a radio quality in a serving cell of a secondary carrier within the carrier to be measured is smaller than a sum of a measurement value of a radio quality in a serving cell of the primary carrier and a predetermined offset value for a predetermined period.

A sixth characteristic of the present embodiment is summarized in that a radio base station used in a mobile communication system configured such that a mobile station communicates using a primary carrier and one or a plurality of secondary carriers having different carrier frequencies, comprising, a transmission unit configured to transmit measurement control information including a carrier to be measured and a reporting condition, to the mobile station, and a reception unit configured to receive a measurement report including a measurement result of the carrier to be measured, from the mobile station that determines that the reporting condition is satisfied, and a control unit configured to add and delete a secondary carrier in accordance with the measurement report, in which the control unit is configured to change the reporting condition in accordance with the network load.

As described above, according to the present invention, it is possible to provide a mobile communication method, a mobile station, and a radio base station by which the CCs used in CA communication can be managed appropriately in accordance with the radio quality and network load.

DESCRIPTION OF EMBODIMENTS (Mobile Communication System According to First Embodiment of the Present Invention)

With reference to FIG. 1 through FIG. 8, the configuration of a mobile communication system according to a first embodiment of the present invention will be described. The mobile communication system according to the present embodiment is a mobile communication system of an LTE-Advanced scheme (LTE Release-10 scheme).

In the mobile communication system according to the present embodiment, the mobile station UE is configured to be able to perform CA communication by using PCC and one or a plurality of SCCs having different carrier frequencies (EARFCN).

Figure 1:
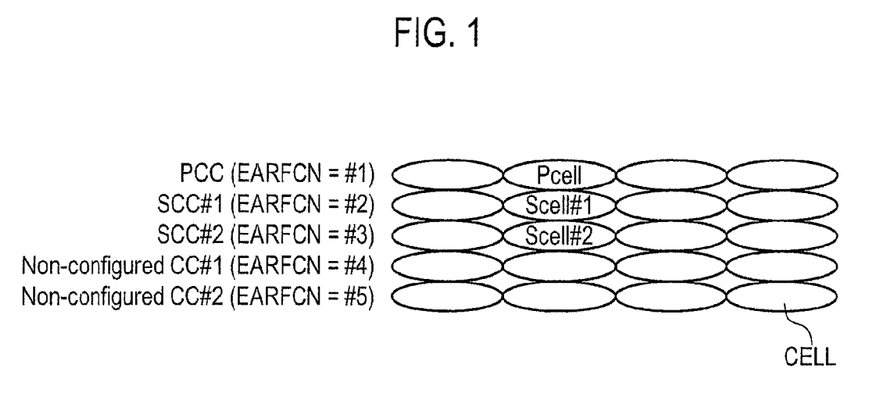
FIG. 1 is a diagram illustrating the entire configuration of a mobile communication system according to a first embodiment of the present invention.

As shown in FIG. 1, the mobile communication system according to the present embodiment is configured to be able to use CCs of EARFCN #1 through EARFCN #5 during the CA communication.

In the mobile communication system according to the present embodiment, as shown in FIG. 1, the mobile station UE performs CA communication by setting the CC of EARFCN #1 as "PCC", the CC of EARFCN #2 as "SCC #1", and the CC of EARFCN #3 as "SCC #2".

Furthermore, the serving cell in the PCC of the mobile station UE is "Pcell", the serving cell in the SCC #1 of the mobile station UE is "Scell #1", and the serving cell in the SCC #2 of the mobile station UE is "Scell #2".

Figure 2:
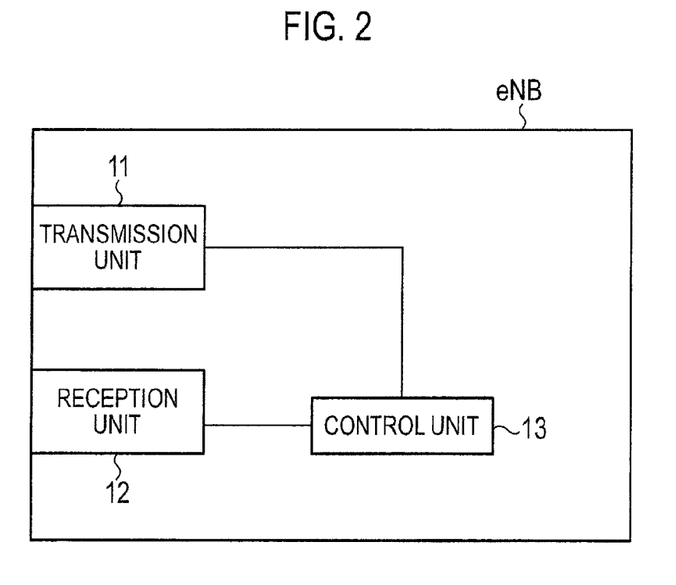
FIG. 2 is a functional block diagram of a radio base station according to the first embodiment of the present invention.

As illustrated in FIG. 2, the radio base station eNB includes a transmission unit 11, a reception unit 12, and a control unit 13.

The transmission unit 11 is configured to transmit a downlink signal to the mobile station UE.

For example, the radio base station eNB is configured to transmit "MeasConfig" containing "MeasObject", "ReportConfig", and "MeasID" to the mobile station UE.

The "MeasObject" is information designating the carrier to be measured depending on RAT and the frequency, the "ReportConfig" is information designating events such as A1 through A7, and B1 and B2, and the transmission trigger of "Measurement Report" such as "Periodical".

Figure 3:
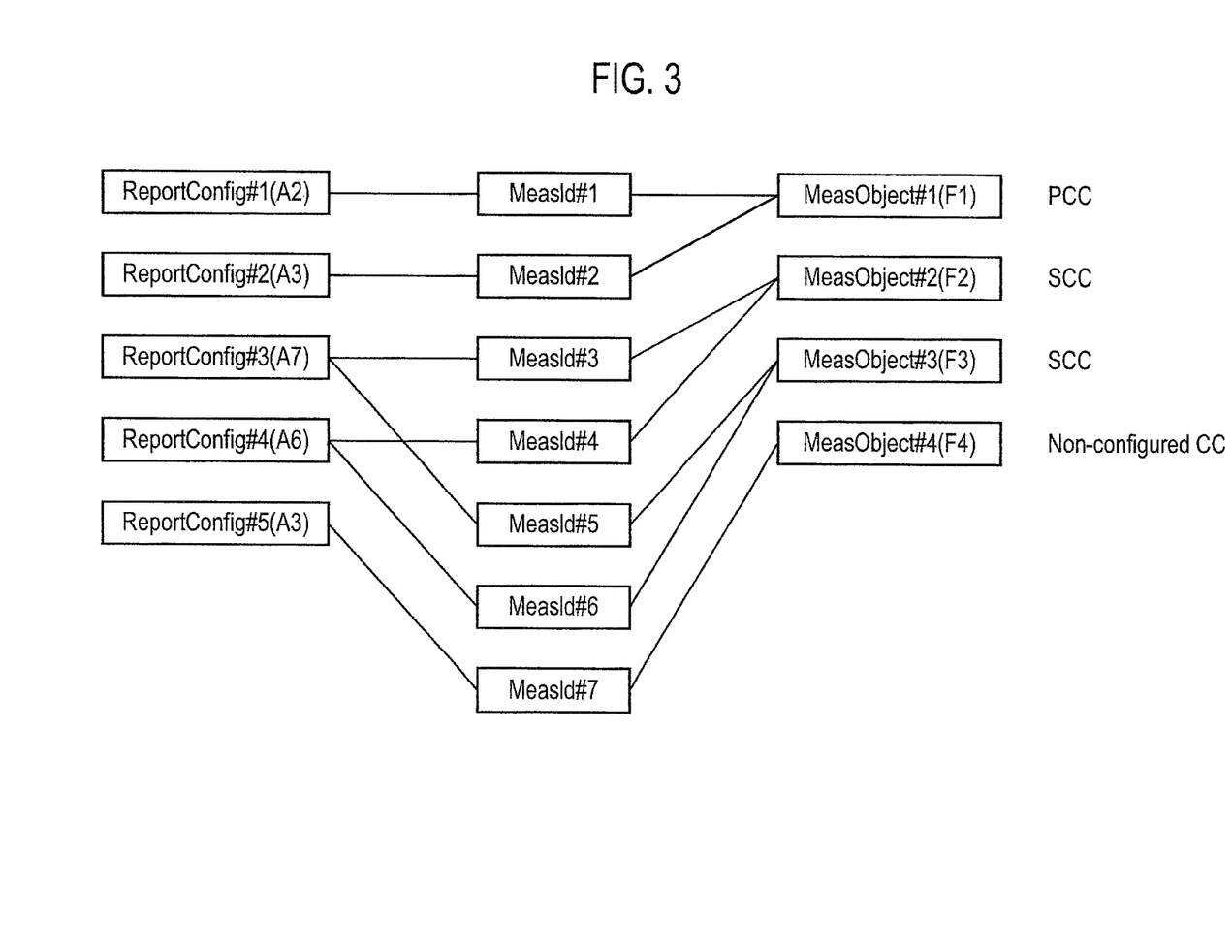
FIG. 3 is a diagram explaining the measurement settings in the mobile communication system according to the first embodiment of the present invention.

Furthermore, as shown in FIG. 3, the "MeasId" is information linking the "MeasObject" and "ReportConfig".

The mobile station UE is configured to perform only measurement of the "MeasObject" correlated with the "ReportConfig" based on the "MeasId".

Figure 4:
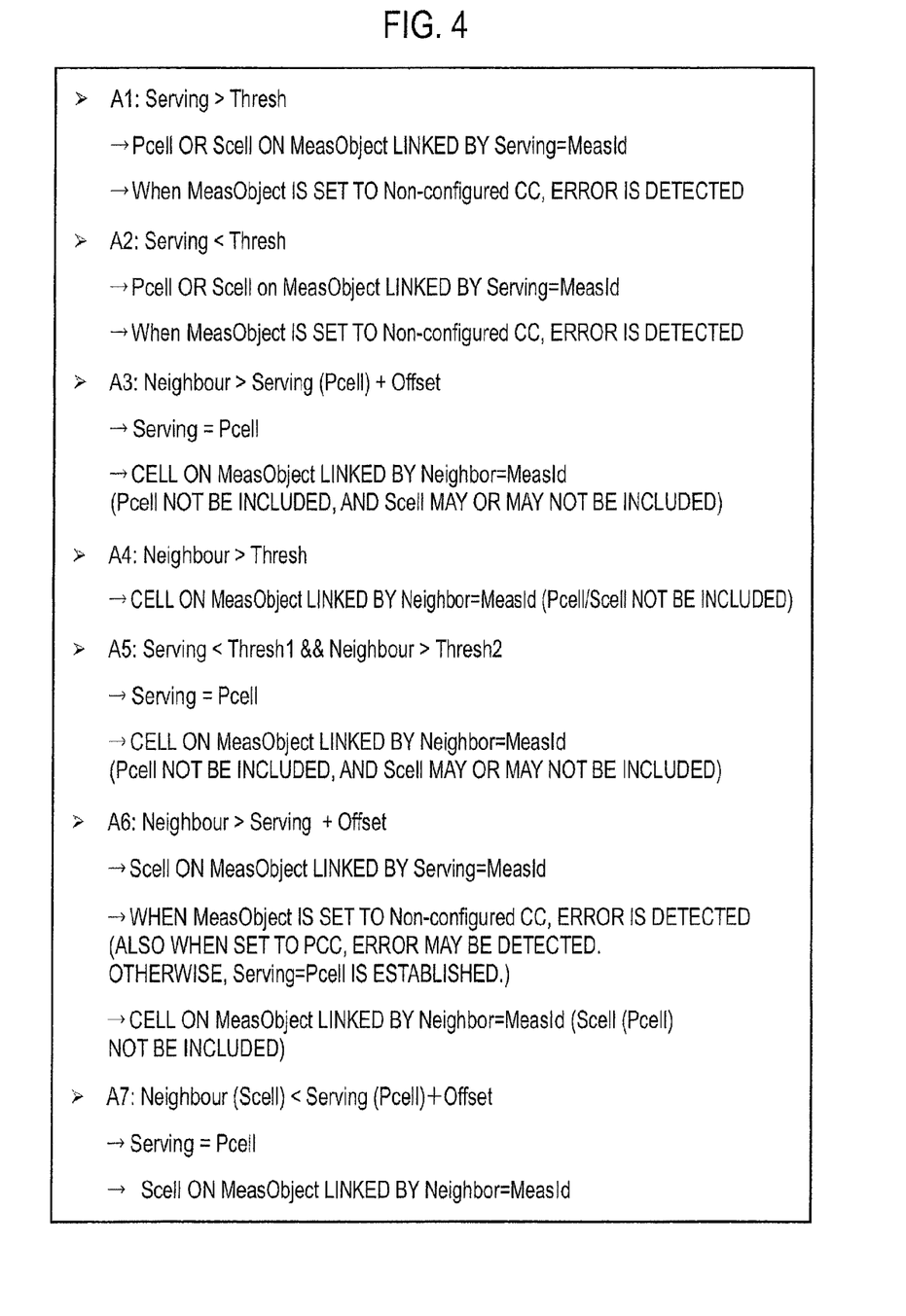
FIG. 4 is a diagram explaining ReportConfig in the mobile communication system according to the first embodiment of the present invention.

FIG. 4 illustrates an example of events A1 through A7.

The event A1 is a transmission trigger indicating that "Serving>Thresh" is satisfied, where "Serving" is the RSRP (Reference Signal Received Power) or RSRQ (Reference Signal Received Quality) in the Pcell, or Scell #1, or Scell #2 on "MeasObject", and "Thresh" is a predetermined threshold value.

If "Non-configured cell" is set in the "MeasObject", the event A1 results in an error.

The event A2 is a transmission trigger indicating that "Serving<Thresh" is satisfied, where "Serving" is the RSRP or RSRQ in the Pcell, or Scell #1, or Scell #2 on "MeasObject", and "Thresh" is a predetermined threshold value.

If "Non-configured cell" is set in the "MeasObject", the event A2 results in an error.

The event A3 is a transmission trigger indicating that "Neighbour>Serving (Pcell)+Offset" is satisfied, where "Serving (Pcell)" is the RSRP or RSRQ in the Pcell on "MeasObject", the "Neighbour" is the RSRP or RSRQ in a cell other than the Pcell on the "MeasObject", and the "Offset" is a predetermined offset value.

Note that the "Neighbour" may be the RSRP or RSRQ in a cell other than the Pcell, Scell #1, or Scell #2 on the "MeasObject".

The event A4 is a transmission trigger indicating that "Neighbour>Thresh" is satisfied, where the "Neighbour" is the RSRP or RSRQ in a cell other than the Pcell, Scell #1, or Scell #2 on "MeasObject", and the "Thresh" is a predetermined threshold value.

The event A5 is a transmission trigger indicating that "Serving<Thresh 1" and "Neighbour>Thresh 2" are satisfied, where the "Serving" is the RSRP or RSRQ in the Pcell on "MeasObject", the "Neighbour" is the RSRP or RSRQ in a cell other than the Pcell on the "MeasObject", and the "Thresh 1" and "Thresh 2" are predetermined threshold values.

Note that the "Neighbour" may be the RSRP or RSRQ in a cell other than the Pcell, Scell #1, or Scell #2 on the "MeasObject".

The event A6 is a transmission trigger indicating that "Neighbour>Serving+Offset" is satisfied, where the "Serving" is the RSRP or RSRQ in the Pcell, Scell #1, or Scell #2 on "MeasObject", the "Neighbour" is the RSRP or RSRQ in a cell (non-serving cell) other than the Pcell, Scell #1, or Scell #2 on the "MeasObject", and the "Offset" is a predetermined offset value.

Note that the "Serving" and the "Neighbour" are the RSRP or RSRQ in a cell within the same CC designated in the "MeasObject".

The event A7 is a transmission trigger indicating that "Neighbour (Scell)>Serving (Pcell)+Offset" is satisfied, where the "Serving (Pcell)" is the RSRP or RSRQ in the Pcell on "MeasObject", the "Neighbour (Scell)" is the RSRP or RSRQ in Scell #1 or Scell #2 on the "MeasObject", and the "Offset" is a predetermined offset value.

Figure 5:
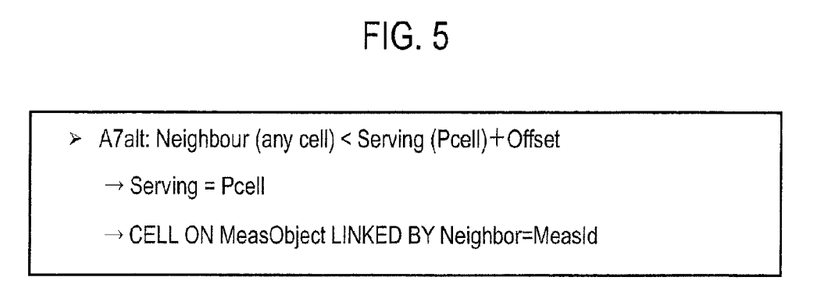
FIG. 5 is a diagram explaining ReportConfig in the mobile communication system according to the first embodiment of the present invention.

Furthermore, as shown in FIG. 5, the event A7 may be a transmission trigger indicating that "Neighbour (any cell) >Serving (Pcell)+Offset" is satisfied.

In such a case, the Neighbour (any cell) is the RSRP or RSRQ in any cell other than the Pcell on "MeasObject". Furthermore, it may be stipulated that the transmission of "MeasReport" is triggered when the conditions of the events A1 through A7 continue to be satisfied for a predetermined period. The predetermined period may be set from the radio base station eNB for the mobile station UE, or may be set in each "ReportConfig".

The reception unit 12 is configured to receive an uplink signal from the mobile station UE.

For example, the reception unit 12 is configured to receive "Measurement Report" including the measurement results of "MeasObject", from the mobile station UE.

The control unit 13 is configured to perform control according to the CA communication by the mobile station UE. For example, as described later, the control unit 13 is configured to change "ReportConfig" depending on the network load.

Furthermore, the control unit 13 is configured to be able to instruct the addition of a new CC, or deletion of an existing CC, or change of the PCC to the mobile station UE performing CA communication, by using an RRC message (for example, an "RRC Reconfiguration" message), in the RRC layer, based on the "Measurement Report" received by the reception unit 12.

Figure 6:
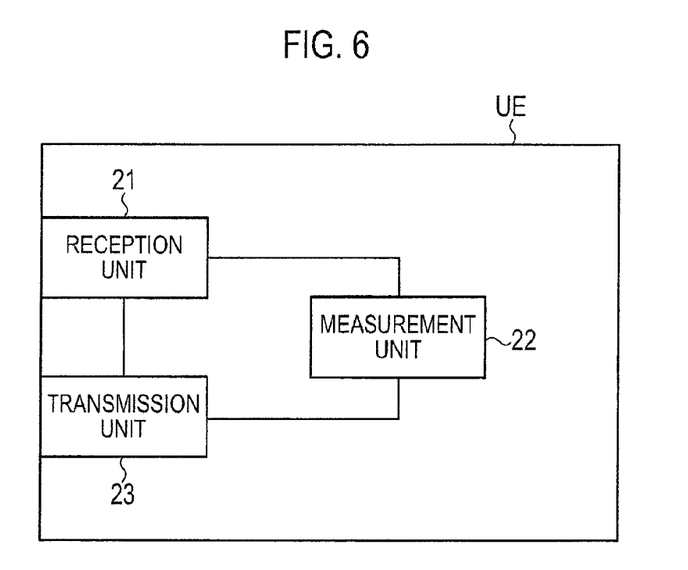
FIG. 6 is a functional block diagram of a mobile station according to the first embodiment of the present invention.

As illustrated in FIG. 6, the mobile station UE includes a reception unit 21, a measurement unit 22, and a transmission unit 23.

The reception unit 21 is configured to receive "MeasConfig" including "MeasObject" and "ReportConfig-A7" from the radio base station eNB.

The measurement unit 22 is configured to perform the measurement process in the "MeasObject" designated by the "MeasConfig".

When "ReportConfig" designated by the "MeasConfig" is satisfied, the transmission unit 23 is configured to transmit "Measurement Report" including the measurement result of the "MeasObject" to the radio base station eNB.

Hereinafter, with reference to FIG. 7 and FIG. 8, the operation of the mobile communication system according to the present embodiment will be explained.

Firstly, with reference to FIG. 7, an operation of the radio base station eNB according to the present embodiment will be explained.

Figure 7:
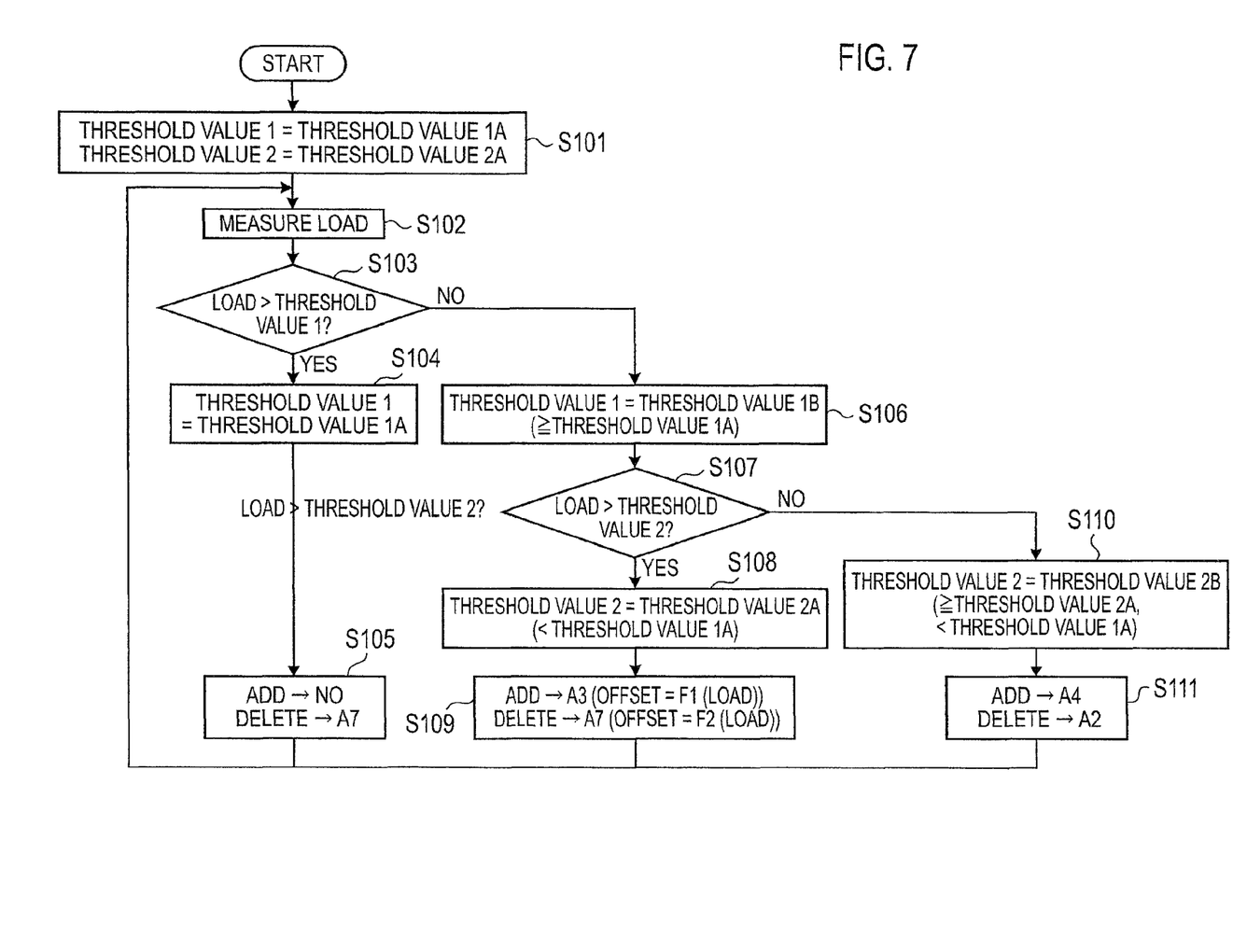
FIG. 7 is a flowchart illustrating an operation of the mobile station according to the first embodiment of the present invention.

As shown in FIG. 7, the radio base station eNB sets a "threshold value 1a" to a "threshold value 1", and a "threshold value 2a" (<the threshold value 1a) to a "threshold value 2" in step S101, and measures the network load in step S102.

The radio base station eNB measures the number of mobile stations UE in an RRC_Connected state, the amount of data stored in the buffer, the amount of uplink interference, the amount of downlink transmission power, the resource utilization rate, and the like, as the network load.

If it is determined in step S103 that the network load is larger than the threshold value 1, then in step S104, the radio base station eNB sets the "threshold value 1a" to the "threshold value 1", and in step S105, the radio base station decides the CC (SCC) to be deleted based on the "Measurement Report" according to the event A7.

In step S105, the radio base station eNB does not add CC (SCC).

On the other hand, if it is determined in step S103 that the network load is not larger than the threshold value 1, then in step S106, the radio base station eNB sets the "threshold value 1b (>=the threshold value 1a)" to the "threshold value 1".

If it is determined in step S107 that the network load is larger than the threshold value 2, then in step S108, the radio base station eNB sets the "threshold value 2a" to the "threshold value 2", and in step S109, the radio base station decides the CC (SCC) to be deleted based on the "Measurement Report" according to the event A7, and the CC (SCC) to be added based on the "Measurement Report" according to the event A3.

On the other hand, if it is determined in step S107 that the network load is not larger than the threshold value 2, then in step S110, the radio base station eNB sets the "threshold value 2b (>=the threshold value 2a and <the threshold value 1a)" to the "threshold value 2", and in step S111, the radio base station decides the CC (SCC) to be deleted based on the "Measurement Report" according to the event A2, and also decides the CC (SCC) to be added based on the "Measurement Report" according to the event A4.

The "Offset" in the event A3 and the "Offset" in the event A7 are values of the load calculated based on the network load, and the relationship "the 'Offset' in the event A3>the 'Offset' in the event A7" is established.

For example, the "Offset" in the event A3 and the "Offset" in the event A7 can be calculated by the following expressions:

(the "Offset" in the event A3)=a3+r3×(network load)
(the "Offset" in the event A7)=a7+r7×(network load)

Here, a3 and a7 are negative values, and r3 and r7 are positive values.

Furthermore, the "threshold values 1a, 1b, 2a, and 2b" are hysteresis values for avoiding the situation in which the type of the events being used switches frequently.

Figure 8:
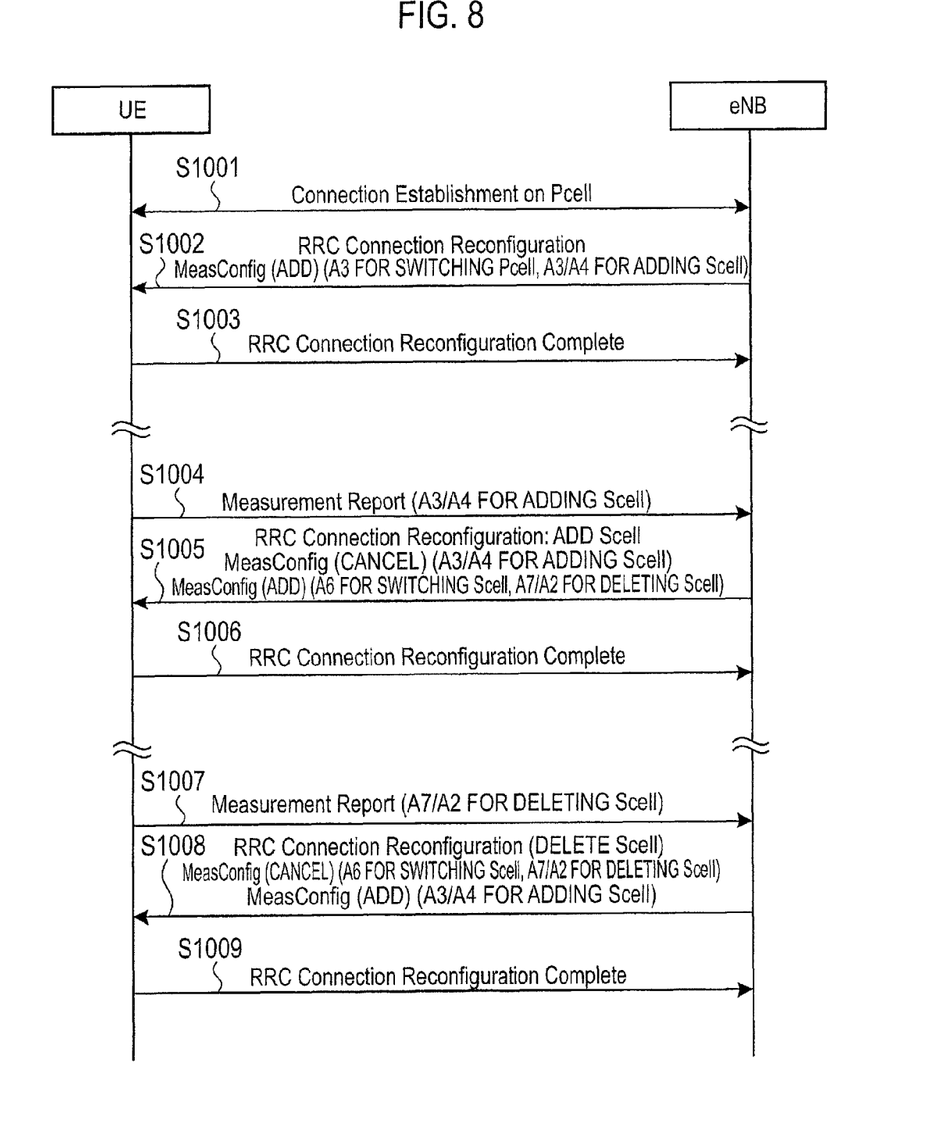
FIG. 8 is a sequence diagram illustrating an operation of the mobile communication system according to the first embodiment of the present invention.

Secondly, with reference to FIG. 8, an operation of the mobile communication system according to the present embodiment is explained.

As shown in FIG. 8, when the Scell is not set, then in step S1001, an RRC connection is established between the radio base station eNB and the mobile station UE in the Pcell, and in step S1002, the radio base station eNB transmits "RRC Connection Reconfiguration" including "MeasConfig", to the mobile station UE.

Furthermore, the "MeasConfig" instructs the mobile station UE to add the "ReportConfig" designating the event A3 used when switching the Pcell, and the "ReportConfig" designating the event A3 (or A4) used when adding an Scell.

In the event A3 used when switching the Pcell, the "Neighbour" is the RSRP or RSRQ of a cell (non-serving cell) other than the Pcell in the PCC, and in the event A3 (or A4) used when adding an Scell, the "Neighbour" is the RSRP or RSRQ of a Non-configured cell.

In step S1003, after making the settings based on the "MeasConfig", the mobile station UE transmits "RRC Connection Reconfiguration Complete" to the radio base station eNB.

In step S1004, the mobile station UE transmits "Measurement Report" according to the event A3 (or A4) to the radio base station eNB.

In step S1005, based on the "Measurement Report" according to the event A3 (or A4), the radio base station eNB decides an Scell (SCC) to be added, and transmits an "RRC Connection Reconfiguration" instructing the addition of the Scell (SCC) to the mobile station UE.

Furthermore, the radio base station eNB instructs the mobile station UE to delete the "ReportConfig" designating the event A3 (or A4) used when adding the Scell, and also to add the "ReportConfig" designating the event A6 used when switching the Scell and the "ReportConfig" designating the event A7 (or A2) used when deleting the Scell, through the "MeasConfig" within the "RRC Connection Reconfiguration".

In the event A6 used when switching an Scell, the "Serving" is the RSRP or RSRQ of an Scell in SCC, and the "Neighbour" is the RSRP OR RSRQ of a cell (non-serving cell) other than the Scell in the SCC.

Furthermore, in the event A7 used when deleting an Scell, the "Serving" is the RSRP or RSRQ of the Pcell, and the "Neighbour" is the RSRP OR RSRQ of Scell, and in the event A2 used when deleting an Scell, the "Serving" is the RSRP or RSRQ of Scell.

In step S1006, after making the settings based on the "MeasConfig", the mobile station UE transmits "RRC Connection Reconfiguration Complete" to the radio base station eNB.

In step S1007, the mobile station UE transmits the "Measurement Report" according to the event A7 (or A2) to the radio base station eNB.

In step S1008, based on the "Measurement Report" according to the event A7 (or A2), the radio base station eNB decides an Scell (SCC) to be deleted, and transmits "RRC Connection Reconfiguration" instructing the deletion of the Scell (SCC) to the mobile station UE.

Furthermore, the radio base station eNB instructs the mobile station UE to delete the "ReportConfig" designating the event A6 used when switching the Scell, and the "ReportConfig" designating the event A7 (or A2) used when deleting the Scell, and also to add the "ReportConfig" designating the event A3 (or A4) used when adding the Scell, through the "MeasConfig" within the "RRC Connection Reconfiguration".

In step S1009, after making the settings based on the "MeasConfig", the mobile station UE transmits "RRC Connection Reconfiguration Complete" to the radio base station eNB.

According to the mobile communication system of the present embodiment, the radio base station eNB can add and delete SCC, and can switch PCC based on the "Measurement Report" transmitted by the mobile station UE, and can therefore avoid the use of CCs with a bad radio quality in the CA communication, and appropriately manage the CCs in accordance with the radio quality and network load.

The characteristics of the present embodiment as described above may be expressed as follows.

A first characteristic of the present embodiment is summarized as a mobile communication method by which a mobile station UE performs CA communication with a radio base station eNB by using PCC (primary carrier) and one or a plurality of SCCs (secondary carriers) having different carrier frequencies, which includes a step A of transmitting, by the radio base station eNB, "MeasConfig (measurement control information)" including "MeasObject (carrier to be measured)" and "ReportConfig-A6 (reporting condition)", to the mobile station UE, and a step B of transmitting, by the mobile station UE, "Measurement Report (measurement report)" including the measurement result of the "MeasObject", to the radio base station eNB, when the "ReportConfig-A6" is satisfied, and in the step B, when the RSRP or RSRQ (measurement values of the radio quality) in a non-serving cell of PCC or SCC within the "MeasObject" is larger than the sum of the RSRP or RSRQ in a serving cell of the PCC or SCC within the "MeasObject" and a predetermined offset value (Offset) for a predetermined period (Time-To-Trigger), the mobile station UE determines that the "ReportConfig-A6" is satisfied.

A second characteristic of the present embodiment is summarized as a mobile communication method by which a mobile station UE performs CA communication with a radio base station eNB by using PCC and one or a plurality of SCCs having different carrier frequencies, which includes a step A of transmitting, by the radio base station eNB, "MeasConfig" including "MeasObject" and "ReportConfig-A7", to the mobile station UE, and a step B of transmitting, by the mobile station UE, "Measurement Report" including the measurement result of the "MeasObject", to the radio base station eNB, when the "ReportConfig-A7" is satisfied, and in the step B, when the RSRP or RSRQ in an Scell within the "MeasObject" is smaller than the sum of the RSRP or RSRQ in the Pcell (a serving cell of the primary carrier) within the "MeasObject" and a predetermined offset value (Offset) for a predetermined period (Time-To-Trigger), the mobile station UE determines that the "ReportConfig-A7" is satisfied.

A third characteristic of the present embodiment is summarized as a mobile communication method by which a mobile station UE performs CA communication with a radio base station eNB by using PCC and one or a plurality of SCCs having different carrier frequencies, which includes a step of transmitting, by the radio base station eNB, "MeasConfig" including "MeasObject" and "ReportConfig", to the mobile station UE, a step of transmitting, by the mobile station UE, "Measurement Report" including the measurement result of the "MeasObject", to the radio base station eNB, when the "ReportConfig" is satisfied, a step of adding and deleting SCC, by the radio base station eNB, in accordance with the "Measurement Report", and a step of changing the "ReportConfig", by the radio base station eNB, in accordance with the network load.

A fourth characteristic of the present embodiment is summarized as a mobile station configured to be able to perform CA communication with a radio base station eNB by using PCC and one or a plurality of SCCs having different carrier frequencies, which includes a reception unit 21 configured to receive "MeasConfig" including "MeasObject" and "ReportConfig-A6" from the radio base station eNB, and a transmission unit 23 configured to transmit "Measurement Report" including the measurement result of the "MeasObject" to the radio base station eNB, when the "ReportConfig-A6" is satisfied, and the transmission unit 23 is configured to determine that the "ReportConfig-A6" is satisfied, when the RSRP or RSRQ in a non-serving cell of the PCC or SCC within the "MeasObject" is larger than the sum of the RSRP or RSRQ in a serving cell of the PCC or SCC within the "MeasObject" and a predetermined offset value (Offset) for a predetermined period (Time-To-Trigger).

A fifth characteristic of the present embodiment is summarized as a mobile station configured to be able to perform CA communication with a radio base station eNB by using PCC and one or a plurality of SCCs having different carrier frequencies, which includes a reception unit 21 configured to receive "MeasConfig" including "MeasObject" and "ReportConfig-A7" from the radio base station eNB, and a transmission unit 23 configured to transmit "Measurement Report" including the measurement result of the "MeasObject" to the radio base station eNB, when the "ReportConfig-A7" is satisfied, and the transmission unit 23 is configured to determine that the "ReportConfig-A7" is satisfied, when the RSRP or RSRQ in an Scell within the "MeasObject" is smaller than the sum of the RSRP or RSRQ in the Pcell within the "MeasObject" and a predetermined offset value (Offset) for a predetermined period (Time-To-Trigger).

A sixth characteristic of the present embodiment is summarized as a radio base station eNB used in a mobile communication system configured such that a mobile station UE performs CA communication by using PCC and one or a plurality of SCCs having different carrier frequencies, which includes a transmission unit 11 configured to transmit "MeasConfig" including "MeasObject" and "ReportConfig", to the mobile station UE, and a reception unit 12 configured to receive "Measurement Report" including the measurement result of the "MeasObject" from the mobile station UE that determines that the "ReportConfig" is satisfied, and a control unit 13 configured to add and delete SCC in accordance with the "Measurement Report", and the control unit 13 is configured to change the "ReportConfig" in accordance with the network load.

It is noted that the operation of the above-described the mobile station UE or the radio base station eNB may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station UE or the radio base station eNB. Further, such a storage medium or a processor may be arranged, as a discrete component, in in the mobile station UE or the radio base station eNB.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method, a mobile station, and a radio base station by which the CCs used in CA communication can be managed appropriately in accordance with the radio quality and network load.

REFERENCE SIGNS LIST eNB . . . Radio base station
UE . . . Mobile station
11, 21 . . . Reception unit
12, 23 . . . Transmission units
13 . . . Control unit
22 . . . Measurement unit

The invention claimed is:

1. A mobile communication method by which a mobile station communicates with a radio base station by using a primary carrier and one or a plurality of secondary carriers having different carrier frequencies, wherein
    a serving cell is present in each of the primary carrier and the secondary carrier, the method comprising:
    a step A of transmitting, by the radio base station, measurement control information including a carrier to be measured and a reporting condition, to the mobile station; and
    a step B of transmitting, by the mobile station, a measurement report including a measurement result of the carrier to be measured, to the radio base station, when the reporting condition is satisfied, wherein
    in the step B, when a measurement value of a radio quality in a non-serving cell of the secondary carrier within the carrier to be measured is larger than a sum of a measurement value of a radio quality in a serving cell of the secondary carrier within the carrier to be measured and a predetermined offset value for a predetermined period, the mobile station determines that the reporting condition is satisfied.

2. A mobile station configured to be able to communicate with a radio base station by using a primary carrier and one or a plurality of secondary carriers having different carrier frequencies, wherein
    a serving cell is present in each of the primary carrier and the secondary carrier, the mobile station comprising:
    a reception unit configured to receive measurement control information including a carrier to be measured and a reporting condition, from the radio base station; and
    a transmission unit configured to transmit a measurement report including a measurement result of the carrier to be measured, to the radio base station, when the reporting condition is satisfied, wherein
    the transmission unit is configured to determine that the reporting condition is satisfied, when a measurement value of a radio quality in a non-serving cell of the secondary carrier within the carrier to be measured is larger than a sum of a measurement value of a radio quality in a serving cell of the secondary carrier within the carrier to be measured and a predetermined offset value for a predetermined period.

* * * * *